United States Patent [19]

Engelhardt et al.

[11] 4,314,052
[45] Feb. 2, 1982

[54] POLYESTER WHICH IS SOLUBLE OR DISPERSIBLE IN WATER, A PROCESS FOR ITS PREPARATION AND ITS USE AS A LEVELLING AUXILIARY, LEVELLING AUXILIARIES AND PROCESSES FOR UNIFORM DYEING

[75] Inventors: Friedrich Engelhardt; Karl Hintermeier, both of Frankfurt am Main; Joachim Ribka, Offenbach am Main-Bürgel; Walter Dürsch; Walter Rupp, both of Königstein, all of Fed. Rep. of Germany

[73] Assignee: Cassella Aktiengesellschaft, Frankfurt am Main Fechenheim, Fed. Rep. of Germany

[21] Appl. No.: 110,343

[22] Filed: Jan. 7, 1980

[30] Foreign Application Priority Data

Jan. 10, 1979 [DE] Fed. Rep. of Germany ....... 2900686

[51] Int. Cl.$^3$ ............... C08G 63/68; C08G 79/04; D06P 1/52; D06P 1/60
[52] U.S. Cl. .................................. 528/287; 8/552; 8/584
[58] Field of Search .................. 528/287; 8/552, 557

[56] References Cited

U.S. PATENT DOCUMENTS

| | | | |
|---|---|---|---|
| 2,911,389 | 11/1959 | Pernert | 528/287 |
| 3,036,044 | 5/1962 | Browne et al. | 528/287 |
| 3,511,857 | 5/1970 | Baranauckas et al. | 528/287 |
| 4,098,741 | 7/1978 | Login | 528/287 |
| 4,210,685 | 7/1980 | Login et al. | 528/287 |

FOREIGN PATENT DOCUMENTS

| | | | |
|---|---|---|---|
| 49-45749 | 12/1974 | Japan | 8/557 |
| 50-89498 | 7/1975 | Japan | 528/287 |
| 50-101492 | 8/1975 | Japan | 528/287 |
| 51-61594 | 5/1976 | Japan | 528/287 |

*Primary Examiner*—Maria Parrish Tungol
*Attorney, Agent, or Firm*—Connolly and Hutz

[57] ABSTRACT

Improved polyesters soluble or dispersible in water having an apparent average molecular weight of 800 to 5,000 and containing phosphonic ester moieties are useful as levelling auxiliaries for uniform dyeing and are produced by esterifying dibasic acids and dihydric alcohols, either or both of which contain phosphonic acid moieties, phosphonic acid ester moieties or both.

15 Claims, No Drawings

POLYESTER WHICH IS SOLUBLE OR DISPERSIBLE IN WATER, A PROCESS FOR ITS PREPARATION AND ITS USE AS A LEVELLING AUXILIARY, LEVELLING AUXILIARIES AND PROCESSES FOR UNIFORM DYEING

It is already known to prepare water-soluble mixed polyesters which owe their solubility, above all, to a content of more than 10 mol % of units containing sulpho groups, such as, for example, sulphodicarboxylic acid units (compare, for example, German Patent Specification No. 2,438,379). However, all these sulphomonomers are either not readily accessible, expensive or unstable to heat. Thus, for example, the sodium salt of 5-sulphopropoxyisophthalic acid dimethyl ester is prepared by addition of carcinogenic propanesultone onto 5-hydroxyisophthalic acid dimethyl ester, which is not readily accessible and expensive. On the other hand, inexpensive sulphosuccinic acid and its esters are not stable to heat and split off sulphur dioxide at condensation temperatures above 180° C. The situation in the case of diols containing sulpho groups is even more unfavourable.

The invention relates to a polyester which is soluble or dispersible in water and is characterised in that it contains phosphonic acid ester groups. The invention also relates to a process for the preparation of the polyester containing phosphonic acid groups and its use as a levelling auxiliary, as well as the levelling auxiliaries prepared using the polyester according to the invention and processes for uniform dyeing.

The polyester according to the invention has, in particular, an apparent average molecular weight of 800 to 5,000, preferably of 1,500 to 3,000, measured in a vapour pressure osmometer with dimethylformamide as the solvent, and contains, as phosphonic acid ester groups, in particular those of the general formula

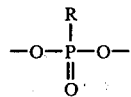

I wherein R denotes hydrogen or an aliphatic, cycloaliphatic, aromatic or araliphatic radical, and the aliphatic radical and aliphatic part of the araliphatic radical can also be interrupted by one or more oxygen atoms. R particularly denotes hydrogen, an aliphatic radical with 1 to 22 C atoms, which can also be interrupted by one or more oxygen atoms, a cycloaliphatic radical with 5 to 8 C atoms, phenyl or naphthyl, it also being possible for the phenyl or naphthyl radical to be substituted by up to 3 alkyl radicals with 1 to 6 C atoms each, or an aliphatic radical which is substituted by phenyl, has 1 to 12 C atoms in the aliphatic part and can also be interrupted by one or more oxygen atoms.

The polyester according to the invention can be prepared by a process in which 100 mol % of dibasic acids suitable for the preparation of polyesters, and/or derivatives of these acids, in particular esters, acid halides or anhydrides thereof, are subjected to condensation reactions with 80 to 140 mol %, preferably 90 to 130 mol %, of dialcohols or esters thereof with lower carboxylic acids in a manner which is in itself known, up to an apparent average molecular weight of 800 to 5,000, preferably 1,500 to 3,000, and the starting components are chosen such that they contain, relative to the sum of the chain members, 2.5 to 50%, preferably 5 to 30%, of phosphonic acid groups and/or phosphonic acid ester groups.

Suitable diacids (A) for the preparation of the polyester according to the invention are: (A) (a) aromatic, araliphatic, cycloaliphatic and aliphatic dicarboxylic acids, (b) aliphatic, cycloaliphatic, araliphatic and aromatic phosphonic acids, and derivatives of A (a) and A (b), in particular esters, acid halides or anhydrides thereof, and mixtures of these substances. Possible dicarboxylic acids mentioned under (Aa) are all the dicarboxylic acids which can be used for the preparation of polyesters, of the formula

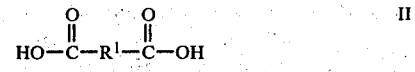

II and corresponding acid halides, anhydrides or esters thereof, which incorporate the chain member

III into the finished polyesters, $R^1$ representing a direct bond or a divalent aliphatic, cycloaliphatic, aromatic or araliphatic radical. $R^1$ preferably denotes a divalent aliphatic radical with 2 to 10 C atoms, a divalent cycloaliphatic radical with 6 to 8 C atoms, a divalent aromatic radical with 6 to 12 C atoms or an araliphatic radical with 6 to 14 C atoms. Examples of suitable aliphatic, cycloaliphatic, aromatic and araliphatic dicarboxylic acids are: oxalic acid, malonic acid, succinic acid, methylmalonic acid, glutaric acid, dimethylmalonic acid, adipic acid, pimelic acid, suberic acid, 2,2-dimethylglutaric acid, azelaic acid, trimethyladipic acid, sebacic acid, fumaric acid, maleic acid, itaconic acid, citraconic acid, mesaconic acid, traumatic acid, muconic acid, 1,2-cyclohexane-dicarboxylic acid, 1,3-cyclohexane-dicarboxylic acid, 1,4-cyclohexane-dicarboxylic acid, norbornanedicarboxylic acid, phthalic acid, isophthalic acid, terephthalic acid, 1,4-naphthalene-dicarboxylic acid, 2,5-naphthalene-dicarboxylic acid, diphenic acid and acids of the general formula

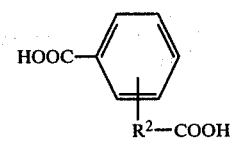

IV wherein $R^2$ denotes an alkylene radical, in the ortho-, meta- or para-position, with 2 to 4 C atoms, for example 4-carboxyphenylacetic acid, 3- or 4-carboxyhydrocinnamic acid and 2- or 4-carboxy-γ-phenylbutyric acid. The aromatic dicarboxylic acids isophthalic acid and terephthalic acid are preferred because they are difficult to saponify.

The carbon skeleton of the possible dicarboxylic acids can also be interrupted by hetero-atoms, such as oxygen or sulphur, or hetero groups, such as —$SO_2$—. Examples of these acids are diglycolic acid, thiodiglycolic acid, thiodipropionic acid, 4,4'-hydroxydibenzoic acid, 4,4'-sulphonyldibenzoic acid and

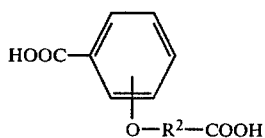

V wherein R² denotes an alkylene radical with 2 to 4 C atoms and the side chain can be in the ortho-, meta- or para-position relative to the carboxyl group of the nucleus.

As already indicated, the dicarboxylic acids mentioned can also be employed in the form of their derivatives, in particular in the form of their esters, anhydrides or acid halides. The acid chlorides are the preferred acid halides. Possible esters are monoesters or diesters with low monoalcohols, that is to say monoalcohols which can easily be distilled off, thus, preferably, those with 1 to 4 carbon atoms, but also those esters with the dialcohols still to be mentioned. Examples of suitable esters, anhydrides and acid chlorides are: the dimethyl, diethyl, di-n-propyl, di-isopropyl and di-n-butyl ester of terephthalic acid; the dimethyl, diethyl, di-n-propyl, di-n-butyl and di-isobutyl ester of isophthalic acid; the dimethyl, diethyl, di-n-propyl, di-isopropyl and di-n-butyl ester of phthalic acid; malonic acid dimethyl, diethyl, di-n-propyl or di-n-butyl ester; succinic acid dimethyl or di-n-butyl ester; glutaric acid diethyl or di-isopropyl ester; adipic acid diethyl or di-isobutyl ester; pimelic acid dimethyl, di-isopropyl or di-n-butyl ester; maleic acid dimethyl, di-isopropyl or di-n-butyl ester; suberic acid dimethyl, diethyl, di-n-propyl or di-n-butyl ester; 1,4-cyclohexane-dicarboxylic acid dimethyl, diethyl, di-n-propyl or di-n-butyl ester; 1,2-cyclohexane-dicarboxylic acid dimethyl, diethyl, di-n-propyl or di-n-butyl ester; 1,3-cyclohexane-dicarboxylic acid dimethyl, diethyl, di-n-propyl or di-n-butyl ester; and phthalic anhydride, maleic anhydride, succinic anhydride and phthalyl chloride.

The phosphonic acids mentioned above under A (b) have the general formula

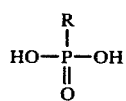

IV and introduce the phosphonic acid ester grouping VII and the chain member VIIa

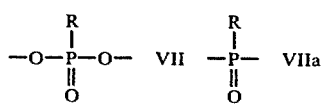

into the polyester. In these formulae, R has the meaning already mentioned.

Examples of suitable phosphonic acids are: methane-, ethane-, n-propane-, i-propane-, n-butane-, n-but-2-ene-, i-butane-, n-octane-, i-octane-, decane-, dodecane-, octadecane-, nonadecane- and docosane-phosphonic acid, cyclopentane-, cyclohexane-, benzene-, α-naphthalene- and β-naphthalene-phosphonic acid, 3-oxapentane-phosphonic acid, 4-oxaheptane- and 4,8-dioxaundecane-phosphonic acid and phosphonic acids of the general formula

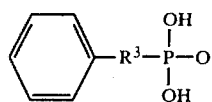

VIII wherein R³ denotes an alkylene radical with 1 to 12 C atoms which can also be interrupted by one or more oxygen atoms, for example benzyl- and phenethyl-phosphonic acid, $C_6H_5CH_2OCH_2CH_2PO(OH)_2$ and $C_6H_5CH_2CH_2OCH_2CH_2OCH_2CH_2PO(OH)_2$.

As already indicated, the phosphonic acids mentioned can also be used in the form of their derivatives, in particular in the form of their monoesters or diesters with lower monoalcohols, that is to say with monoalcohols which can easily be distilled off, preferably those with 1 to 4 C atoms or the dialcohols still to be mentioned, or in the form of their halides, in particular chlorides, or in the form of their anhydrides. Phosphorous acid is appropriately employed only in the form of its esters, in particular its esters with alcohols with 1 to 4 C atoms, for example as diethyl phosphite.

Dialcohols (B) which are suitable in the context of the invention are: (B) (a) aliphatic, cycloaliphatic and araliphatic diols, by which there are also to be understood aliphatic and cycloaliphatic diols containing ether groups and aliphatic and cycloaliphatic diols which contain ether groups and have an aromatic ring system in the molecule, or acyl derivatives thereof with volatile, lower carboxylic acids ($C_1$ to $C_4$), (b) diesters of phosphonic acids or polyphosphonic acids with dialcohols, and mixtures of dialcohols B (a) and/or (Bb).

The diols mentioned under B (a) have the formula $$HO-R^4-OH \qquad IX$$

and incorporate chain members $$-O-R^4-O- \qquad X$$

into the finished polyesters, R⁴ representing a divalent aliphatic, cycloaliphatic or araliphatic radical. R⁴ particularly denotes a divalent aliphatic radical with 2 to 6 C atoms, above all a divalent aliphatic radical with ether bridges, which can also be additionally interrupted by an aromatic nucleus. In the case of aliphatic radicals interrupted by ether bridges and/or aromatic nuclei (in particular a phenylene or naphthylene nucleus), the preferred range of 2 to 6 C atoms indicated relates only to an aliphatic member between two ether bridges or oxygen atoms or aromatic nuclei. The divalent aliphatic radical with ether bridges can have, for example, a molecular weight of up to 10,000, and in some cases even higher, and can be derived, for example, from a polyethylene glycol, an ethylenepropylene polyglycol or a polypropylene glycol. R⁴ also particularly denotes a divalent cycloaliphatic radical with 5 to 10 carbon atoms or a divalent araliphatic radical with 8 to 14 carbon atoms.

Examples of suitable diols are: ethylene glycol, propane-1,2-diol and propane-1,3-diol (trimethylene glycol); butanediols, in particular butane-1,4-diol; pentanediols, such as pentane-1,5-diol; hexanediols, in particular hexane-1,6-diol; decane-1,10-diol; diethylene glycol and ethylene propylene 1,2-glycol; ethylene propylene 1,3-glycol; dipropylene glycol; triethylene glycol and tetraethylene glycol; tripropylene glycol; polyethylene glycol up to a molecular weight of 10,000; polypropylene glycol up to a molecular weight of 10,000 or more; mixed polyethylene/polypropylene glycols (so-called "Pluronics") up to a molecular weight of 10,000 or more; bis-(4-hydroxybutyl) ether; 2,4-dimethyl-2-ethyl-hexane1,3-diol; 2-ethyl-2-butyl-propane-1,3-diol; 2,2-dimethylpropane-1,3-diol; 2-ethyl-2-isobutyl-propane-1,3-diol; 2,2,4-trimethyl-hexane-1,6-diol; 1,3-dihydroxy-cyclohexane; 1,4-dihydroxy-cyclohexane (quinitol); 1,4-bis-(hydroxymethyl)cyclohexane; 1,3-bis-(hydroxymethyl)-cyclohexane; 1,2-bis(hydroxymethyl)-cyclohexane, 1,4-bis-(hydroxymethyl)-benzene, 1,3-bis-(hydroxymethyl)-benzene; 1,2-bis-(hydroxymethyl)-benzene; and 2,6-bis-(hydroxymethyl)-naphthalene.

Suitable diols are also, for example, diphenols which have been converted into araliphatic bishydroxy compounds by reaction on both sides with ethylene oxide and to which, for example, the general formula

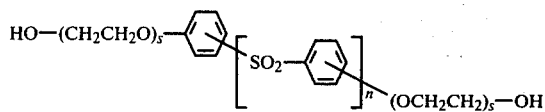 XI wherein $n=0$ or 1, $s=1$ to 20 and the bonds to the benzene nuclei can be in the ortho-, meta- or para-position, or the general formula

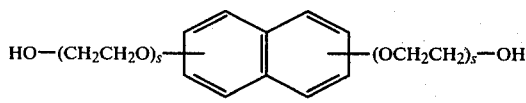 XII wherein $s=1$ to 20, can be attributed. In suitable representatives of the general formula XI n and s can for example have the following meanings: $n=0$ and $s=1$; $n=1$ and $s=1$; $n=0$ and $s=2$; $n=1$ and $s=2$.

The representatives of the diols mentioned for B (a) can also be employed in the form of esters with highly volatile carboxylic acids, such as, for example, formic acid, acetic acid or propionic acid.

The diesters, mentioned under B (b), of phosphonic acids or polyphosphonic acids with dialcohols have, in particular, the following general formulae wherein R has the meaning already given, $R^5$ and $R^6$ denote H, $-CH_3$ or $-C_2H_5$, p denotes 1 to 10, s and z denote 1 to 20 and q and k denote 0, 1, 2 or 3.

The compounds of the general formulae XIII and/or XIV are appropriately employed as mixtures. These compounds can also be employed in the form of esters with highly volatile carboxylic acids.

In order to ensure adequate solubility of the finished polyester in water, the dialcohols of group B are chosen such that at least half of the molar amount thereof employed consists of water-soluble representatives which contain ether groups and incorporate the grouping

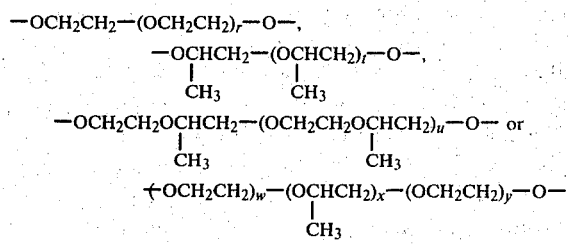

into the finished polyester, r denoting a number from 1 to 230, t denoting a number from 1 to 175 and u denoting a number from 1 to 100. w, x and y are numbers which are equal to or greater than 1 and are sufficiently high for the grouping to achieve a molecular weight of up to 10,000. The abovementioned groupings are incorporated, in particular, by diethylene glycol ($r=1$), triethylene glycol ($r=2$), polyethylene glycols ($r=4$ to 230), dipropylene glycol ($t=1$) and ethylene propylene polyglycols ($u=1$ to 100), or by compounds, with a molecular weight of up to 10,000, which are formed by reacting polypropylene glycol with ethylene oxide and which thus as a rule provide at least half of the molar amount of the compounds of group B employed. Diethylene glycol and dipropylene glycol are preferred.

Instead of in each case one molecule of a dicarboxylic acid of group A and in each case one molecule of a dialcohol of group B, two molecules of a hydroxy acid (C) or derivatives thereof, in particular esters thereof with lower monoalcohols or diols or inner esters thereof, can also be used. Such hydroxy acids (C) which can be used are (a) hydroxycarboxylic acids and (b) hydroxyphosphonic acids or mixtures of the two.

Hydroxycarboxylic acids of the formula

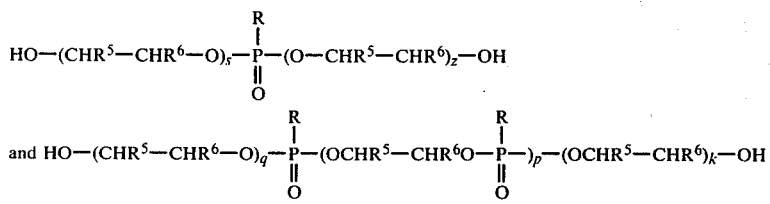

and incorporate into the finished polyester the chain members

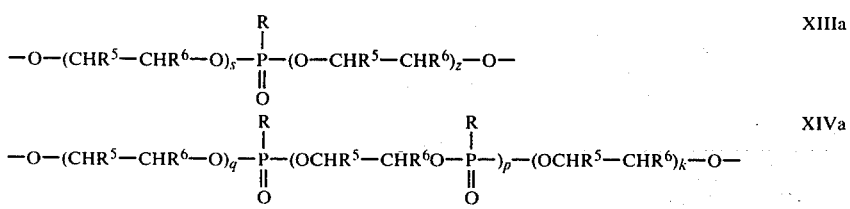

$$HO-R^7-COOH \qquad \text{XV}$$

incorporate the chain member $$-O-R^7-CO- \qquad \text{XVI}$$

into the finished polyester, $R^7$ representing a divalent aliphatic, cycloaliphatic or araliphatic radical. $R^7$ particularly denotes a divalent aliphatic radical with 1 to 10 carbon atoms, a divalent cycloaliphatic radical with 6 to 11 carbon atoms or a divalent araliphatic radical with 8 to 12 carbon atoms, it also being possible, in the araliphatic radical, for the aliphatic part to be separated from the aromatic part by a hetero-atom and/or for the aliphatic part to be interrupted by one or more hetero-atoms. A possible hetero-atom is, in particular, oxygen. Examples of suitable hydroxycarboxylic acids are glycolic acid, lactic acid, 3-hydroxypropionic acid, 4-hydroxybutyric acid, 5-hydroxypentanoic acid, 5-hydroxy-3-pentanoic acid, mandelic acid, 3-hydroxymethyl-cyclohexanecarboxylic acid, 4-hydroxymethyl-cyclohexane-carboxylic acid and 6-hydroxymethyl-decalin-2-carboxylic acid, and meta- and para-hydroxyethoxy-benzoic acid, as representatives of compounds of the general formula $$HO-(CHR^5-CHR^6O)_s-\text{C}_6H_4-COOH \qquad \text{XVII}$$

wherein $R^5$, $R^6$ and s have the meanings already given. Further suitable hydroxycarboxylic acids have the general formula $$HO-(CHR^5CHR^6O)_s-\text{naphthyl}-COOH \qquad \text{XVIII}$$

Examples which may be mentioned of suitable esters of hydroxycarboxylic acids are: lactic acid methyl ester, lactic acid ethyl ester, 4-hydroxybutyric aciid methyl ester, mandelic acid ethyl ester and para-hydroxyethoxy-benzoic acid methyl ester. Examples of suitable inner esters of hydroxycarboxylic acids are butyrolactone and valerolactone.

Compounds of the general formulae $$HO-(CHR^5-CHR^6-O)_s-\underset{\underset{O}{\|}}{\overset{R}{\underset{|}{P}}}-OH \quad \text{and} \qquad \text{IXX}$$

$$HO-(CHR^5-CHR^6-O-\underset{\underset{O}{\|}}{\overset{R}{\underset{|}{P}}}-O)_p-H \qquad \text{XX}$$

are understood, in particular, as a hydroxyphosphonic acid in the context of the present invention, which incorporate into the polyester chain members of the general formulae $$-O-(CHR^5-CHR^6-O)_s-\underset{\underset{O}{\|}}{\overset{R}{\underset{|}{P}}}-O- \qquad \text{XIXa}$$

$$-O-(CHR^5-CHR^6-O-\underset{\underset{O}{\|}}{\overset{R}{\underset{|}{P}}}-O)_p- \qquad \text{XXa}$$

wherein R, $R^5$ and $R^6$ have the meanings already given and wherein s denotes 1 to 20 and p denotes 1 to 10. Suitable inner esters of hydroxyphosphonic acids are 2-oxo-1,3,2-dioxa-phospholanes of the general formula $$R-\underset{\underset{O-CHR^6}{\diagdown}}{\overset{\overset{O}{\|}}{\underset{}{P}}}\overset{O-CHR^5}{\diagup} \qquad \text{XXI}$$

wherein R, $R^5$ and $R^6$ have the meanings already given.

Examples of suitable representatives of such hydroxyphosphonic acids and phospholanes are $$HO-CH_2CH_2O-\underset{\underset{O}{\|}}{\overset{CH_3}{\underset{|}{P}}}-OH, \ HO-(CH_2CH_2O-\underset{\underset{O}{\|}}{\overset{n\text{-}C_3H_7}{\underset{|}{P}}}-O)_3-H \text{ and}$$

$$CH_3-\underset{\underset{O-CH_2}{\diagdown}}{\overset{\overset{O}{\|}}{\underset{}{P}}}\overset{O-CH_2}{\diagup}$$

When hydroxy acids C are employed, half the molar amount is attributed to the diacids of group A and the other half of the molar amount is attributed to the dialcohols of group B. For example, when m mol % of compounds of the general formulae XIV and/or XX, in which p is greater than 1, are used, m.p mol % of phosphonic acid ester groups are incorporated into the polyester.

Schematically, a section of the molecule of the finished polyester is, for example, built up as follows from the compounds indicated for the classes of compound A, B and C:

$$-A-B-A-C-C-A-B-$$

wherein —A—, —B— and —C— represent a chain member which results, by condensation, from one of the compounds mentioned under classes A, B and C. The polyester contains, relative to the sum of the chain members (=100%), 2.5 to 50%, preferably 5 to 30%, of phosphonic acid ester groups. It is also conceivable for phosphonic acid ester groups to be present at the ends of the polyester, that is to say in the form of phosphonic acid half-ester groups.

Instead of the monomeric units A, B or C, it is, of course, also possible to employ lower precondensates or oligomers of the abovementioned units to prepare the polyester, such as, for example

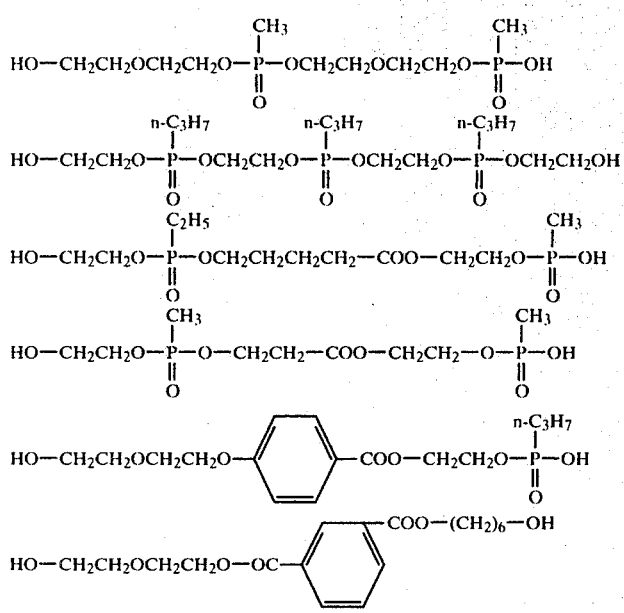

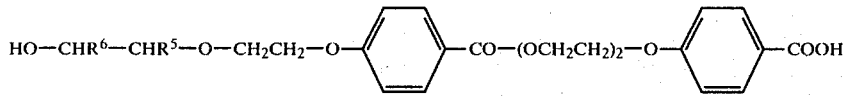

and

HO—CHR⁶—CHR⁵—O—CH₂CH₂—O—⟨⟩—CO—(OCH₂CH₂)₂—O—⟨⟩—COOH wherein $R^6$ and $R^5$ have the meanings already given.

The starting materials containing phosphonic acid groups or containing phosphonic acid ester groups are readily accessible and in some cases are inexpensive commercial products (for example from Hoechst AG, Germany); like the other starting materials, they can easily be prepared by the processes known for the particular class of compound. The preparation of compounds of the general formulae XIV, XV, XVIII and XIX is described in German Offenlegungsschrift No. 2,726,478.

The polyester according to the invention is prepared by condensation of the starting components, in the customary manner, at an elevated temperature of 100° to 280° C., in particular 150° to 230° C., preferably under an atmosphere of an inert gas, such as, for example, nitrogen or carbon dioxide, and/or under reduced pressure and appropriately whilst stirring, the volatile condensation products (water and/or alcohols), and if appropriate excess starting components, usually a diol, being distilled off. If the reaction is carried out under normal pressure, it can be appropriate to apply a vacuum of, for example, 10 to 30 mbars, towards the end of the condensation reaction and, if appropriate, thereafter to apply a further vacuum of about 1 to 3 mbars, or if appropriate even lower, in order substantially to remove the volatile products. The condensation reaction usually lasts 3 to 20 hours and is continued until the desired apparent average molecular weight of 800 to 5,000, preferably 1,500 to 3,000, has been reached. The starting materials used for the condensation reaction can all be initially mixed and then subjected to a mutual condensation reaction. In the case of this procedure, the units are randomly distributed in the product. However, the products according to the invention can also be obtained by first subjecting only some of the starting materials to a pre-condensation reaction and then subsequently subjecting the remainder of the starting materials to a further condensation reaction with the precondensate in any desired sequence and at any desired interval of time. Apart from trans-esterification processes, which are always possible, products which have a different distribution of the individual units and which can also be different in their technological properties can be prepared in this way with the same starting materials. Different technological properties can be obtained in a particularly simple manner by carrying out the condensation reaction to different extents, that is to say by products with different molecular weights.

The polycondensation reaction can be carried out either with the customary esterification or trans-esterification catalysts or entirely without such catalysts. In specific cases, each procedure can have its particular advantages, and in addition, different products, above all, of course, with regard to the molecular weight and the solubility, are accordingly obtained in an otherwise identical reaction procedure. Examples of esterification catalysts or trans-esterification catalysts which can be used are, inter alia, alkali metal hydroxides, such as sodium hydroxide or potassium hydroxide, or alkali metal alcoholates, such as sodium methylate or ethylate, alkaline earth metal oxides or hydroxides, such as, for example, the corresponding calcium or magnesium compounds, and furthermore also zinc oxide or cadmium oxide, salts of organic carboxylic acids, such as sodium acetate or formate, calcium acetate or formate, manganese acetate or formate or zinc acetate or formate, and organic titanium compounds, in particular the titanium alcoholates, such as, for example, titanium isopropylate or titanium butylate. The amounts to be used depend, above all, on the activity of the particular catalyst. The amount of catalyst is usually kept as low as possible. Acid catalysts are not very suitable because they convert the preferred diol diethylene glycol into dioxane and thus substantially withdraw it from the chain formation reactions.

It is to be assumed that breaks in the chain of some starting components containing phosphonic acid ester groups take place in the course of the condensation reaction and the broken pieces join together to form new compounds. Thus, for example, the compound

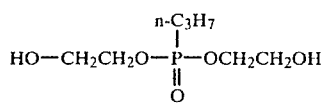

is probably not co-condensed completely directly, but possibly only after rearrangement into

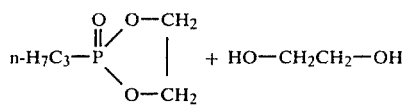

via renewed ring opening by another terminal hydroxyl group. It is also not certain what proportion of the phosphonic acid ester groups is finally incorporated inside the chain and what proportion is incorporated at the chain end. The relatively low pH value of the polycondensates according to the invention could suggest a high proportion of phosphonic acid half-ester groups at the chain ends. The resulting polycondensates, in aqueous solution, are thus also appropriately rendered neutral with alkalis, such as, for example, sodium hydroxide or potassium hydroxide, or ammonia.

The apparent average molecular weight is determined in a vapour pressure osmometer in dimethylformamide as the solvent. The value measured is a sufficiently accurate criterion for characterising the polyesters according to the invention. (The determination of the molecular weight in a vapour pressure osmometer is described by S. Kume and H. Kobayashi in Makromol. Chem. 79 (1964), 1 to 7).

The polyesters according to the invention are suitable for many application purposes, for example as water-soluble adhesive compositions, as sizing agents and as hair sprays, but above all as levelling agents and dispersing agents in the dyeing of synthetic fibres, in particular polyester fibres and blended fabrics of polyester and viscose staple or wool, by the exhaustion process.

Compared with polyesters containing sulpho groups, the polyesters according to the invention are more economical to prepare since the starting materials containing phosphonic acid are cheaper and simpler to prepare than the hitherto customary sulphonomers, such as, for example, sulphopropoxy isophthalic acid dimethyl ester.

The polyesters according to the invention offer a hitherto unknown possibility of modifying the properties of water-soluble polyesters and thus enable products with completely new properties to be prepared.

The effectiveness of the polyesters according to the invention as levelling auxiliaries for the uniform dyeing of synthetic fibres or mixtures thereof with natural fibres with disperse dyestuffs can be improved further when a compound of the general formula R$^8$-O-(CH$_2$CH$_2$O)$_v$-CH$_2$CH$_2$OH    XXII wherein R$^8$ denotes an aliphatic, aromatic or araliphatic radical with 6 to 22 C atoms, the castor oil radical or the grouping R$^9$—COO—CH$_2$CH$_2$CH$_2$CH$_2$— or R$^9$—CO—, wherein R$^9$ is an aliphatic, aromatic or araliphatic radical with 6 to 22 C atoms, and v denotes a number from 4 to 49, is (a) admixed to the polyester according to the invention in a weight ratio of 1:(0.1 to 5), preferably 1:(0.5 to 2), or (b) co-condensed with the polyester according to the invention in a weight ratio of 1:(0.2 to 2).

The radicals represented by R$^8$ and R$^9$ can also be substituted, in particular by hydroxyl. The ethoxylation products of the general formula XXII required are commercially available as emulsifiers in some cases, and they can be obtained in a manner which is in itself known by reacting compounds R$^8$OH with 5 to 50 mols of ethylene oxide. Examples of suitable starting materials for the reaction with ethylene oxide are n-hexanol, n-heptanol, isooctanol, lauryl alcohol, cetyl alcohol, stearyl alcohol, oleyl alcohol, caproic acid, capric acid, caprylic acid, lauric acid, myristic acid, palmitic acid, stearic acid, arachic acid, behenic acid, oleic acid, ricinoleic acid, linoleic acid and the monoesters of the abovementioned acids with butane-1,4-diol, that is to say, for example, 4-hydroxybutyl caproate, 4-hydroxybutyl laurate, 4-hydroxybutyl palmitate, 4-hydroxybutyl stearate, 4-hydroxybutyl oleate, 4-hydroxybutyl ricinoleate and 4-hydroxybutyl linoleate, and furthermore castor oil, phenol, mandelic acid, salicyclic acid, α-naphthol, β-naphthol, tert.-butylphenol, hexylphenols, nonylphenols, isododecylphenol and tri-tert.-butylphenol.

The improved levelling agent is prepared according to the above possibility (a) by simple uniform mixing of the polyester according to the invention with a compound of the general formula XXII in a weight ratio of 1:(0.1 to 5), preferably 1:(0.5 to 2). After mixing the components, if the polyester had not yet been neutralised, the mixture has a slightly acid pH value. It is then appropriate to adjust the pH value of the levelling agent to 6 to 7 by stirring in an inorganic or organic base, such as, for example, potassium hydroxide, solution or sodium hydroxide solution or ammonia. By this procedure, all or some of the acid groups present are converted into the corresponding salts. To prepare an improved levelling auxiliary according to the above possibility (b), a polyester according to the invention is reached with a compound of the general formula XXII at temperatures from 100° to 300° C., preferably 150° to 250° C., that is to say the components are heated to this temperature and melted together. The reaction times are 10 minutes to 10 hours, preferably 2 to 5 hours. The reaction components are usually melted together without using a solvent or diluent. The reaction can be carried out under normal pressure, but it is appropriate to carry it out under reduced pressure. The polycondensation reaction is preferably carried out under a pressure of about 0.5 to 30 mbars. The volatile products formed during the reaction are distilled off. The reaction mixture is advantageously stirred during the reaction.

The reaction between the polyester and the ethoxylation component is usually carried out in the presence of one of the esterification catalysts or trans-esterification catalysts already mentioned. However, the polycondensation can also be carried out entirely without a catalyst (usually with an extension of the reaction time).

The polycondensates obtained by reacting the polyester and the compound XII are viscous melts which, when diluted with water, give clear to opalescent viscous solutions or dispersions. On diluting with water, it is possible either to stir the melt into water or to stir water into the polycondensate. In general, the aqueous solutions of the polycondensate have a slightly acid pH value. It is appropriate to adjust the pH values of the aqueous solutions to 6 to 7 by stirring in an inorganic or organic base, such as, for example, sodium hydroxide solution or potassium hydroxide solution or ammonia.

The polyesters according to the invention and, in particular, their mixtures with a compound of the general formula XXII and, in particular, their condensation products with a compound of the general formula XXII are outstandingly suitable as levelling auxiliaries in the dyeing of materials of synthetic fibres or mixtures thereof with natural fibres with disperse dyestuffs. In the process for the uniform dyeing of materials of synthetic fibres and mixtures thereof with natural fibres with water-insoluble disperse dyestuffs by the exhaustion method, in addition to the disperse dyestuffs and pH-regulating substances, there is also added to the dyebaths, as a levelling agent, a polyester according to the invention and in addition, preferably, also a compound of the general formula XXII in a weight ratio of polyester according to the invention to compound XXII of 1:(0.1 to 5), preferably 1:(0.5 to 2), or a mixture of a polyester according to the invention with a compound of the general formula XXII in the abovementioned proportions, or, preferably, a polyester according to the invention which contains, in co-condensed form, a compound of the general formula XXII, appropriately in the form of an aqueous solution in amounts of 0.02 to 5 g/l (based on 100% of product), preferably 0.2 to 2 g/l, and the dyeing is otherwise carried out in the customary manner. A high stability of the dye liquor is achieved, and completely level dyeings with a high tinctorial yield are obtained. Outstanding results are obtained even on goods which are difficult to dye, such as wound packages, or dyestuffs which are difficult to use for dyeing. Particularly good results are obtained in the case of quick-dyeing processes. In such quick-dyeing processes, relatively large amounts of dyestuff are suddenly made available to the goods to be dyed, at temperatures of about 130° C. The danger of unlevel dyeings which thereby arises is avoided by using the polyester according to the invention, preferably a mixture of the polyester with a compound of the general formula XXII, or preferably a polyester according to the invention containing a co-condensed compound of the general formula XXII.

To carry out the dyeing process, the dyebaths are set up at 50° to 60° C. and adjusted to pH 4 to 6 by pH-regulating substances, in the customary manner. The polyester according to the invention, preferably a mixture of the polyester with a compound of the general formula XXII, or preferably a polyester according to the invention containing a co-condensed compound of the general formula XXII, is then appropriately added in the form of a solution in amounts of 0.02 to 5 g/l, preferably 0.2 to 2 g/l (based on 100% of polycondensate). The predispersed, water-insoluble disperse dyestuff and the material to be dyed are then added, the bath is heated up to the required dyeing temperature and dyeing is carried out for the customary dyeing time. The dyeings are finished in a known manner, for example by reductive after-treatment.

In the case of quick-dyeing processes, the liquor is prepared separately from the material to be dyed, with the addition of the polyester according to the invention, preferably a mixture of the polyester with a compound of the general formula XXII, or preferably a polyester according to the invention containing a co-condensed compound of the general formula XXII. The liquor, heated to the dyeing temperature of 120° to 130° C., is then rapidly brought into contact with the material to be dyed. If the process is carried out by the so-called metering technique, the polycondensation product according to the invention can also be added to the dyebath before adding the dyestuff dispersion.

When the additives according to the invention are used, the use of other solvents can also be effected or be appropriate, above all the addition of a proportion of other solvents, preferably of alcohols, such as methanol, ethanol or isopropanol, or dipolar aprotic solvents, such as dimethylformamide or dimethylsulphoxide.

The term "aliphatic" which, in the context of the present invention, is also used in connection with the term "araliphatic", refers in particular to alkenyl or alkenylene radicals, above all however to alkyl or alkylene radicals. Cycloaliphatic radicals are in particular cycloalkyl or cycloalkylene radicals. Aromatic radicals, also in connection with the term "araliphatic", are in particular those which contain a benzene-derived or naphthalene-derived radical.

EXAMPLES

Abbreviations used:
EO = ethylene oxide
MEG = monoethylene glycol
DEG = diethylene glycol
TEG = triethylene glycol
PEG = polyethylene glycol
DPG = dipropylene glycol
hex-1,6 = hexane-1,6-diol
IPA = isophthalic acid
ADA = adipic acid
DMT = terephthalic acid dimethyl ester
naph-1,4 = naphthalene-1,4-dicarboxylic acid
SA = succinic anhydride
MA = maleic anhydride
MW = (apparent) average molecular weight
propylphospholane = 2-n-propyl-2-oxo-1,3,2-dioxaphospholane Unless otherwise indicated, the temperature data are in °Celsius and the percentage data are percentages by weight.

EXAMPLE 1

20 mol % of n-propanephosphonic acid bis-($\beta$-hydroxyethyl)ester; 80 mol % of DEG; 10 mol % of PEG 600; 50 mol % of IPA; 50 mol % of DMT; 1.5 mol batch.

63.6 g of propanephosphonic acid bis-($\beta$-hydroxyethyl)ester, 127.2 g of diethylene glycol, 90 g of polyethylene glycol 600 and 145.5 g of terephthalic acid dimethyl ester, together with 3 g of titanium tetrapropylate as a catalyst, are heated to 150° C. under nitrogen in the course of one hour, whilst stirring, in a 2 liter four-necked flask with a ground joint and with a stirrer, thermometer, gas inlet tube and descending condenser. The temperature is then increased by 10° C. per hour, up to 200° C. A little DMT initially sublimes on the cooler upper walls of the glass flask. However, at about 170° C., this sublimate is already flushed back into the glass flask again and is gradually co-condensed. About 22 g of methanol distillate are collected in the receiver.

124.5 g of isophthalic acid which is at least 99% pure are now stirred in at 200° C. (under nitrogen). The reaction temperature is then again increased by a further 10° C. per hour, up to 240° C., whilst stirring thoroughly. The reaction mixture is then heated at 240°–245° C. under a vacuum of about 20 mbars for a further 2 hours and finally in a vacuum of 1 mbar for a further one hour. About a further 55 g of distillate, predominantly water and excess diethylene glycol or ethylene glycol, are collected in this second heating phase.

This gives 442 g of a light-coloured melt of MW 1780, which is diluted, whilst still warm, to 2,210 g (=20% strength) and neutralised with water and about 18 g of 27% strength sodium hydroxide solution. If appropriate, the light-coloured solution can be freed completely from turbidity by stirring with 1–2% of kieselguhr and pressing off the mixture over a pressure filter. This solution is outstandingly suitable as a levelling auxiliary for quick-dyeing methods in polyester dyeing.

Polyester solutions with similarly good properties are obtained if, instead of propanephosphonic acid bis-(β-hydroxyethyl)ester, the homologous methane-, ethane- or n-butanephosphonic acid esters are employed in an aliquot amount.

EXAMPLE 2

25 mol % of n-propanephosphonic acid; 30 mol % of DMT; 35 mol % of IPA; 20 mol % of β-hydroxyethoxy-benzoic acid; 90 mol % of DEG; 10 mol % of PEG 1000; 1.5 mol batch.

47.93 g of 97% strength n-propanephosphonic acid, 143.1 g of diethylene glycol, 150 g of polypropylene glycol 1000 and 87.3 g of terephthalic acid dimethyl ester are heated (without the addition of a special catalyst) to 150° C. under nitrogen in the course of one hour in the same apparatus as described in Example 1. This temperature is increased by 10° C. per hour. At 200° C., 87.15 g of isophthalic acid and 54.6 g of p-hydroxyethoxy-benzoic acid are subsequently added and the temperature is further increased by 10° C. per hour, up to 240° C., in a stream of nitrogen. A total of about 120 g of distillate are thereby collected. The mixture is stirred under a vacuum of about 20 mbars for a further 3 hours and in a vacuum of 1–3 mbars for a further 2 hours (also at 240° C.), and 452 g of a light-coloured melt of MW 1,620 are then obtained as the yield. The melt is diluted, whilst still warm, to 2,260 g (corresponding to a 20% strength solution) and at the same time neutralised with 1,780 g of water and 28 g of 27% strength sodium hydroxide solution. A slight turbidity can easily be removed by stirring the solution with 1–2% of Celite J 2 and pressing off the mixture over a pressure filter. This solution is outstandingly suitable as a levelling auxiliary for quick-dyeing methods in polyester dyeing.

EXAMPLE 3

A levelling auxiliary with good properties similar to those in Example 2 is obtained by analogous polycondensation of 20 mol % of ethanephosphonic acid; 40 mol % of DMT; 40 mol % of IPA; 100 mol % of DEG and 10 mol % of PEG 600, MW 1,640.

EXAMPLE 4

A levelling auxiliary with good properties similar to those in Example 2 is also obtained by analogous polycondensation of 20 mol % of methanephosphonic acid, 80 mol % of cyclohexane-1,4-dicarboxylic acid, 100 mol % of DPG and 5 mol % of PEG 3000, MW 1,710.

EXAMPLE 5

20 mol % of n-propanephosphonic acid dimethyl ester; 80 mol % of IPA; 100 mol % of DEG; 10 mol % of PEG 600; 1.5 mol batch.

159 g of diethylene glycol, 90 g of polyethylene glycol 600, 199.2 g of pure isophthalic acid and 45.6 g of n-propanephosphanic acid dimethyl ester are heated to 160° C. with 2 g of titanium tetrabutylate, as a catalyst, under nitrogen in the course of one hour, whilst stirring, in the same test apparatus as described in Example 1. The reaction temperature is then increased uniformly to 240° C. in the course of 8 hours, during which water and methanol are distilled off. A waterpump vacuum of about 20 mbars is then applied for 2 hours and then a vacuum of 1 to 3 mbars for a further 2 hours. This gives 396 g of a light-coloured melt of MW 2,060, which is diluted to 1,980 g and at the same time neutralised with water and about 17 g of 27% strength sodium hydroxide solution. Turbidity, which is still present in most cases, can be removed by stirring the solution with 1 to 2% of kieselguhr and pressing off the mixture over a filter press. A clear, only slightly yellowish-coloured 20% strength solution which is outstandingly suitable as a levelling auxiliary for dyeing polyester/wool with disperse dyestuffs is obtained.

Results which are virtually just as good are obtained if, instead of n-propanephosphonic acid dimethyl ester, the equivalent amount of the diethyl ester, the di-n-propyl ester or the di-n-butyl ester is employed.

EXAMPLE 6

20 mol % of "propylphospholane"; 90 mol % of IPA; 100 mol % of DEG. 1.5 mol batch.

45 g of 2-n-propyl-2-oxo-1,3,2-dioxa-phospholane, 159 g of diethylene glycol, 224.1 g of isophthalic acid and 3 g of titanium tetraisopropylate are heated to 160° C. in the course of one hour in the same glass apparatus as described in Example 1, during which a continuous, weak stream of nitrogen is again passed through the apparatus. The temperature of the melt is then increased by 10° C. per hour, up to 220° C., and the melt is left at 220° to 225° C. for 4 hours. Continuous, good thorough mixing of the melt by means of an effective stirrer is also important in this procedure. Finally, a waterpump vacuum of 20 mbars is applied at 220° to 225° C. for a further 3 hours and a fine vacuum of 1 to 3 mbars is then applied for 2 hours. This gives 353 g of a light-coloured melt of MW 2390 which can easily be diluted with 1,397 g of water and 15 g of 27% strength sodium hydroxide solution to give 1,765 g of a white, neutral emulsion. The product exhibits an excellent levelling action during dyeing of polyester fibres with disperse dyestuffs.

EXAMPLE 7

A product which has good properties similar to those in Example 6 but which dissolves in water giving a clear solution is obtained if, instead of 100 mol % of DEG, only 90 mol % of DEG and in addition a further 10 mol % of PEG 600 are employed. The MW of this product is 2,040.

EXAMPLE 8

30 mol % of decanephosphonic acid methyl hydroxyethyl ester; 40 mol % of DMT; 45 mol % of IPA; 75 mol % of DEG; 20 mol % of PEG 300. 0.5 mol batch.

39.75 g of diethylene glycol, 38.8 g of terephthalic acid dimethyl ester, 30 g of polyethylene glycol 300, 42 g of decanephosphonic acid methyl hydroxyethyl ester

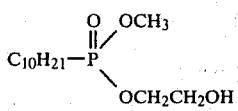

and 1 g of titanium tetraisopropylate are heated to 150° C. in the course of one hour, whilst passing a moderate stream of nitrogen over and whilst stirring thoroughly, in a one liter four-necked flask with ground joints and the same equipment as described in Example 1. The temperature is increased to 190° C. in the course of a further two hours and further increased to 200° C. in the course of one hour. 37.35 g of isophthalic acid (at least 99% pure) are then introduced into the hot melt and the temperature is further increased to 220° C. in the course of two hours. Stirring is then continued at 220° to 225° C. for 4 hours, under a vacuum of 20 mbars at the same temperature for a further 4 hours and finally under a vacuum of 1 to 3 mbars, again for 4 hours. Methanol and water are distilled off during the condensation reaction and this gives, as the residue, 146 g of a light-coloured melt of MW 1,460 which can easily be diluted to 730 g and neutralised with 576 g of water and 8 g of 27% strength sodium hydroxide solution to give a light-coloured 20% strength solution. A slight whitish, pulverulent turbidity can readily be removed by stirring with 1 to 2% of Perlite filtering aid and pressing off the mixture over a pressure filter.

EXAMPLE 8a

Virtually the same product as in Example 8 is obtained using an aliquot amount of 2-n-decyl-2-oxo-1,3,2-dioxa-phospholane instead of decanephosphonic acid monomethyl mono-hydroxyethyl ester.

Polyesters according to the invention which have the following percentage composition can also be prepared in an analogous manner:

EXAMPLE 8b 15 mol % of n-propyl-2-oxo-1,3-dioxa-phospholane; 15 mol % of 2-hexadecyl-2-oxo-1,3,2-dioxa-phospholane; 40 mol % of DMT; 45 mol % of IPA; 85 mol % of DEG; 10 mol % of PEG 400.

EXAMPLE 8c 15 mol % of 2-methyl-2-oxo-1,3,2-dioxa-4-methyl-phospholane; 15 mol % of 2-octadec-9-enyl-2-oxo-1,3,2-dioxa-phospholane; 40 mol % of DMT; 45 mol % of IPA; 10 mol % of PEG 400; 85 mol % of DEG.

EXAMPLE 8d 15 mol % of 2n-propyl-2-oxo-1,3,2-dioxa-4-ethyl-phospholane; 15 mol % of octadecyl-phosphonic acid mono-methyl mono-hydroxyethyl ester; 40 mol % of DMT; 45 mol % of succinic anhydride; 75 mol % of DEG; 20 mol % of PEG 300.

EXAMPLE 8e

As Example 8d, but in place of 45 mol % of SA only 25 mol % of SA and instead also 20 mol % of MA.

EXAMPLE 9

20 mol % of phenylmethane-phosphonic acid diethyl ester; 20 mol % of ADA; 20 mol % of naph-1,4; 60 mol % of DEG; 40 mol % of MEG; 30 mol % of TEG. 0.5 mol batch.

12.4 g of monoethylene glycol, 31.8 g of diethylene glycol, 22.5 g of triethylene glycol, 21.6 g of naphthalene-1,4-dicarboxylic acid, 43.8 g of adipic acid and 22.8 g of benzylphosphonic acid diethyl ester are heated to 150° C., with 1 g of titanium tetraisopropylate as a catalyst, in a one liter four-necked flask with ground glass joints and the same equipment as described in Example 1. The reaction temperature is increased to 220° C. in the course of 6 hours, whilst stirring thoroughly and continuously passing over a slight stream of nitrogen which facilitates transportation of ethanol and water, and the condensation reaction is continued at this temperature for a further 4 hours. A vacuum of 10 to 30 mbars is then applied, still at 220° to 225° C., for a further 4 hours and finally a fine vacuum of about 1 mbar is applied for a period of 2 hours. This gives 118 g of a light-coloured molten residue of MW 1,680 which can easily be diluted to 590 g with water and 7 g of 27% strength sodium hydroxide solution to give a 20% strength neutral solution. A slight pulverulent turbidity is removed by stirring with 12 g of kieselguhr (=about 2%) at room temperature for half an hour and then subjecting the mixture to pressure filtration.

Instead of 20 mol % of phenylmethane-phosphonic acid diethyl ester, it is also possible to use an aliquot amount of benzenephosphonic acid dimethyl ester or cyclohexane-phosphonic acid dimethyl ester without substantially changing the properties of the polycondensate.

A similar water-soluble polyester is also obtained if, instead of 12.4 g of mono-ethylene glycol, an aliquot amount of propane-1,3-diol, hexane-1,6-diol or 2,2'-dimethylpropane-1,3-diol is employed in Example 9.

EXAMPLE 10

10 mol % of Hoe T 2710; 90 mol % of DEG; 10 mol % of PEG 600; 52.5 mol % of IPA; 47.5 mol % of DMT. 1.5 mol batch.

143.1 g of diethylene glycol, 90 g of polyethylene glycol 600 and 138.2 g of terephthalic acid dimethyl ester are heated to 150° C., with 2 g of titanium tetraisopropylate as a catalyst, in the course of one hour and then to 160° C. in the course of one hour, in the same test apparatus as described in Example 1. About 27 g of methanol are distilled off in the stream of nitrogen. 70 g of Hoe T 2710, which is a condensation product of 1 mol of n-propane phosphonic acid, 2 mols of n-propane phosphonic acid anhydride and 5.5 mols of ethylene oxide, of the approx. formula

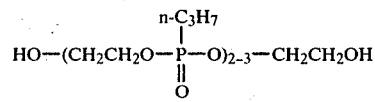

(commercial product from Hoechst AG, Frankfurt/Main, West Germany), are now introduced and the temperature is increased to 180° C. in the course of 2 hours. 130.7 g of isophthalic acid are then introduced and the temperature in the reaction flask is further increased uniformly up to 220° C. in the course of 4 hours. The mixture is further stirred at 220° to 225° C. for 4 hours, in a stream of nitrogen, and then at 230° to 235° C. for a further 2 hours. A vacuum of about 20 mbars is then applied at the latter temperature for a further 4 hours, and a vacuum of 1 to 3 mbars is applied for 1 hour. This gives 435 g of a light-coloured melt which is diluted to 2.175 g with water and about 39 g of 27% strength sodium hydroxide solution to give a 20% strength neutral solution. Any turbidity still present can easily be removed, as already described, by treatment with 1 to 2% of kieselguhr. The average molecular weight of this polycondensate is 1.940.

EXAMPLE 11

10 mol % of Hoe T 2710; 90 mol % of DEG; 5 mol % of Pluriol PE 3100; 47.5 mol % of DMT; 52.5 mol % of IPA. Batch = 1.5 mols.

143.1 g of diethylene glycol, 82.5 g of Pluriol PE 3100 (manufacturer: BASF=Polypropylene glycol 950+ethylene oxide up to a MW of 1.100), 138.2 g of DMT and 2 g of titanium tetraisopropylate are heated to 150° C. in the course of one hour, under nitrogen and whilst stirring, and to 160° C. in the course of a further hour, in the test apparatus of Example 1. About 27 g of methanol are thereby distilled off.

70 g of Hoe T 2710 (see Example 10) are now mixed in, the mixture is further heated to 180° C. in the course of 2 hours and 130.7 g of pure isophthalic acid are also added at this temperature. The reaction temperature is then increased to 220° C. in the course of 2 hours and kept at 220° to 225° C. for 4 hours, whilst stirring vigorously. The mixture is then heated to 230° to 235° C. for 2 hours, a vacuum of about 20 mbars is then applied and the condensation reaction is continued under this vacuum and at 230° to 235° C. for 2 hours. Finally, a fine vacuum of about 1 mbar is applied at the same temperature for a further hour. This gives 396 g of a light-coloured melt of MW 1,600, which can easily be diluted to 1,980 g with water and about 30 g of 27% strength sodium hydroxide solution to give a light-coloured, colloidal 20% strength solution of pH 6.5.

A related product is obtained if, instead of 82.5 g (=5 mol %) of Pluriol PE 3100, 127.5 g (=5 mol %) of Pluriol PE 4300 (=polypropylene glycol 1100+ethylene oxide up to a MW of 1,700) are employed.

EXAMPLE 12

20 mol % of dimethyl phosphite; 35 mol % of DMT; 45 mol % of IPA; 100 mol % of DEG; 10 mol % of PEG 600.

159 g of diethylene glycol, 90 g of polyethylene glycol 600, 101.9 g of terephthalic acid dimethyl ester and 3 g of titanium tetraisopropylate are heated to 150° C. in the course of one hour, under nitrogen and whilst stirring, in the test apparatus of Example 1 and the reaction temperature is then increased to 180° C. in the course of 3 hours. 112 g of isophthalic acid and 33 g of dimethyl phosphite are now stirred in and the temperature is increased to 200° C. in the course of 2 hours and to 220° C. in the course of a further 2 hours. Thereafter, the condensation reaction is continued at 220°-225° C. for 4 hours and the temperature is subsequently further increased to 240° C. in the course of 2 hours. Finally, a vacuum of about 20 mbars is applied at this temperature for a further 2 hours. This gives 312 g of a light-coloured melt of MW 1,750 which is appropriately diluted to 1,560 g with water and about 30 g of 27% strength sodium hydroxide solution, giving a mixture corresponding to a 20% strength colloidal solution of pH value 7.0. If appropriate, remaining turbidity is removed by stirring with 1-2% of kieselguhr and pressing off the mixture over a pressure filter.

EXAMPLE 13

20 mol % of Hoe T 2710 (see Example 10) 45 mol % of DMI; 45 mol % of DMT; 100 mol % of DEG; 10 mol % of PPG 1020.

159 g of diethylene glycol, 153 g of polypropylene glycol 1020, 131 g of terephthalic acid dimethyl ester, 131 g of isophthalic acid dimethyl ester and 3 g of titanium tetraisopropylate are heated to 150° C. under nitrogen in the course of one hour and to 160° C. in the course of a further hour in the test apparatus of Example 1. 140.4 g of the Hoe T 2710 containing phosphono groups which is described in Example 10 are now added and the melt is heated under nitrogen to a temperature increased by 10° C. per hour, until the temperature reaches 210° C., after 5 hours. The mixture is then heated to 210° to 215° C. for 2 hours, under a vacuum of 10 to 25 mbars at the same temperature for a further 4 hours and finally under a vacuum of about 1 mbar at 210° to 215° C. for a further 2 hours. This gives 480 g of a light-coloured melt of average MW 1,890 which is diluted with water and about 78 g of 27% strength sodium hydroxide solution to give 2,350 g of a 20% solution of pH value 7.0. A slight pulverulent white precipitate can easily be removed as described in Example 12.

EXAMPLE 14

100 g of the 20% strength solution of the polyester prepared according to Example 10 and 15 g of the 100% pure oxyethylation product of castor oil and 36 mols of ethylene oxide (commercial product from HOECHST AG) are stirred until homogeneous. 115 g of a light-coloured water-clear 30% strength solution which is very particularly suitable as a levelling auxiliary for dyeing polyester fabrics by means of quick-dyeing methods are obtained. When equal amounts by weight are used, the levelling effect of this mixture is increased by 20–25% compared with the effect of the pure polyester according to Example 10, although the oxyethylation product of castor oil by itself exhibits only a very slight levelling action.

The same product is also obtained if the corresponding amount of the oxyethylation product of castor oil is stirred until homogeneous (preferably at about 120° C.) into the anhydrous melt of the polyester according to Example 10 (that is to say still before dilution with water) and the mixture is only then diluted with water, and neutralised with a little sodium hydroxide solution, to give a 30% strength formulation.

EXAMPLE 15

Levelling auxiliaries with powerful synergistic effects are likewise obtained when a homogeneous mixture is prepared from 100 g of the 20% strength solution of Example 10 and (a) 20 g of castor oil + 50 mols of ethylene oxide, (b) 15 g of ricinoleic acid methyl ester + 15 mols of ethylene oxide, (c) 20 g of dodecylphenol + 20 mols of ethylene oxide, (d) 20 g of oleic acid + 10 mols of ethylene oxide or (e) 10 g of butane-1,4-diol monostearate + 15 mols of ethylene oxide.

EXAMPLE 16

At the same temperature (at 200°-230° C.), the same amount by weight of the product obtained by adding 36 mols of ethylene oxide onto 1 mol of castor oil is stirred, under nitrogen, into 435 g of the polyester melt prepared according to the description in Example 10, a vacuum of about 20 mbars is then applied and the condensation reaction is continued at 220° to 225° C. for 2 hours. This gives about 835 g of a homogeneous, light-coloured co-condensate which can easily be diluted with water and about 20 ml of 27% strength sodium hydroxide solution to give an almost colourless neutral 20% strength solution. This solution is outstandingly suitable as a levelling auxiliary in the dyeing of polyester/viscose staple and polyester/cotton.

Instead of Emulsogen EL, it is also possible to co-condense the additives mentioned under a to e in Example 15 in an analogous manner by the procedure of Example 16.

EXAMPLE 17

A liquor, of 130° C., which consists of soft water of pH 4.5 (adjusted with acetic acid) and 0.5 g/l of a linear, water-soluble polyester of molecular weight 2,000, which had been prepared according to Example 10, is allowed to flow through packages ("cheeses") of texturised polyester yarns on a high temperature dyeing apparatus at a liquor ratio of 1:10.

A mixture, pre-dispersed in water of 40° C., of the following disperse dyestuffs in commercially available form is added rapidly to the above liquor by means of a metering device: 0.4% of the dyestuff of the formula

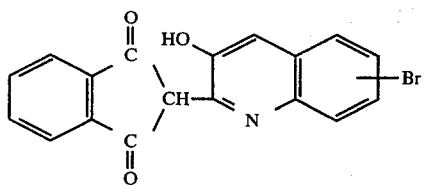

0.52% of the dyestuff of the formula

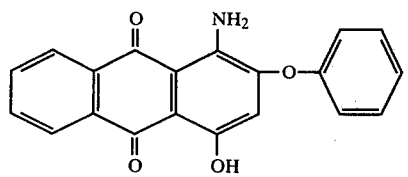

and 0.17% of the dyestuff of the formula (consisting of equal parts)

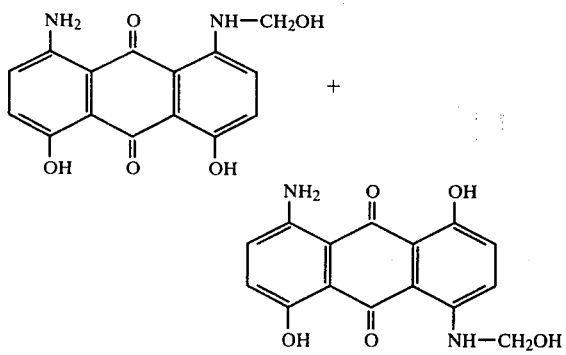

The amount flowing through the cheese is 20 l/kg per minute. After treatment at 130° C. for 30 minutes, the system is cooled, the liquor is drained off and a reductive cleaning operation is carried out.

A completely level brown dyeing with complete dyestuff exhaustion results.

If the same dyeing is carried out with the same dyestuffs under identical conditions, but without the addition of the water-soluble linear polyester and using commercially available dispersing auxiliaries (based on naphthalenesulphonic acid/formaldehyde condensates) and levelling auxiliaries (consisting of fatty acid polyglycol ester, polyglycol and oxyethylated alkylphenols), a non-uniform dyeing with marked differences in the depth of colour and in the colour shade of an individual package results.

EXAMPLE 18

The procedure followed is as in Example 17, but using the linear water-soluble polyester according to Example 1. Dyeing is carried out at 130° C. for 30 minutes, and a completely level brown dyeing is likewise obtained.

EXAMPLE 19

To carry out the dyeing, the procedure followed is as described under Example 17, but using 0.4% of the disperse dyestuff of the formula

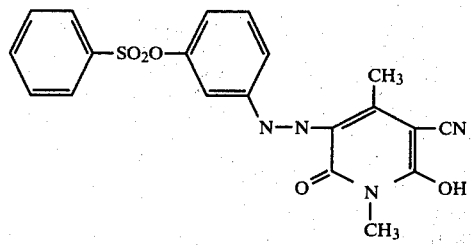

0.32% of the disperse dyestuff of the formula

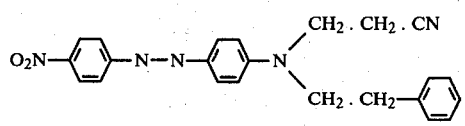

and 0.26% of the dyestuff of the formula

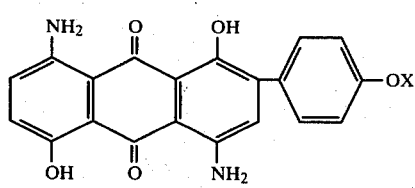

X=40%-H and 60%-$CH_3$

Dyeing is carried out at 130° C. for 25 minutes, reductive after-treatment is effected and a level brown dyeing is obtained. If the linear water-soluble polyester for this dyeing is replaced by commercially available dispersing auxiliaries and levelling auxiliaries, a non-level dyeing with marked differences in depth of colour and in the colour shade results.

EXAMPLE 20

Example 17 is repeated, but instead of the polyester prepared according to Example 10, a levelling auxiliary prepared according to Example 14 is employed. A comparable result is obtained with as little as 0.4 g/l of the levelling auxiliary.

EXAMPLE 21

Example 17 is repeated, but instead of the polyester prepared according to Example 10, a levelling auxiliary prepared according to Example 15e is employed. A comparable result is obtained with as little as 0.38 g/l of the levelling auxiliary.

We claim:

1. A polyester soluble or dispersible in water, containing phosphonic acid ester moieties of the formula $$-O-\underset{\underset{O}{\|}}{\overset{R}{\underset{|}{P}}}-O-$$

with the polyester having an apparent average molecular weight of 800 to 5,000 and also comprising chain member moieties selected from the group consisting of the formula $-\underset{\|}{\overset{O}{C}}-R^1-\underset{\|}{\overset{O}{C}}-$, the formula $-\underset{\underset{O}{\|}}{\overset{R}{\underset{|}{P}}}-$, the formula $-O-R^4-O$, wherein R is hydrogen, an aliphatic moiety with 1 to 22 carbon atoms which may also be interrupted by one or more oxygen atoms, phenyl substituted aliphatic moiety having 1 to 12 carbon atoms in the aliphatic portion and which also may be interrupted by one or more oxygen atoms, a cycloaliphatic moiety with 5 to 8 carbon atoms, phenyl, phenyl substituted by 1 to 3 alkyls having 1 to 6 carbon atoms each, naphthyl, or napthyl substituted by 1 to 3 alkyls having 1 to 6 carbon atoms each;

$R^1$ is a direct bond, a divalent aliphatic radical with 2 to 10 carbon atoms, a divalent cycloaliphatic radical with 6 to 8 carbon atoms, a divalent aryl radical with 6 to 12 carbon atoms, or a divalent araliphatic radical with 6 to 14 carbon atoms and each of those moieties may also be interrupted by one or more of oxygen, sulfur or $SO_2$;

$R^4$ is a divalent aliphatic, cycloaliphatic or araliphatic moiety whose carbon skeleton may also be interrupted by oxygen, phenylene, naphthylene or $-C_6H_5-SO_2-C_6H_5-$;

$R^5$ and $R^6$ are hydrogen, methyl or ethyl;

$R^7$ is a divalent aliphatic radical with 1 to 10 carbon atoms, a divalent cycloaliphatic radical with 6 to 11 carbon atoms or a divalent araliphatic radical with 8 to 12 carbon atoms and each may also be interrupted by oxygen;

s and z is each a number from 1 to 20;
p is a number from 1 to 10 and
q and k are each 0, 1, 2 or 3.

2. A polyester according to claim 1 having an apparent average molecular weight of 1,500 to 3,000 measured in a vapor pressure osmometer with dimethylformamide solvent.

3. A polyester according to claim 1 wherein 2.5 to 50% of polyester precursor monomer segments contain phosphonic acid ester moieties.

4. A polyester according to claim 1 wherein 5 to 30% of polyester precursor monomer segments contain phosphonic acid ester moieties.

5. A polyester according to claim 1 comprising the condensation product of
   (A) 100 molar parts of dibasic acids selected from the groups comprising
      (a) dicarboxylic acid of the formula $$HO-\underset{\|}{\overset{O}{C}}-R^1-\underset{\|}{\overset{O}{C}}-OH$$

their acid halides, anhydrides, esters or mixtures thereof;
      (b) phosphonic acid of the formula $$HO-\underset{\underset{O}{\|}}{\overset{R}{\underset{|}{P}}}-OH$$

their acid halides, anhydrides, esters with monoalcohols with 1 to 4 carbon atoms or with aliphatic, cycloaliphatic or araliphatic diols, or mixtures thereof; or mixtures of the compounds a and b; and
   (B) 80 to 140 molar parts of dialcohols selected from the groups comprising
      (a) diols of the formula

HO-$R^4$-OH wherein $R^4$ is a divalent aliphatic, cycloaliphatic or araliphatic radical; or an oxyethylated diphenol of the formula $$HO-(CH_2CH_2O)_s-\left[\phantom{x}\underset{}{\bigcirc}-SO_2-\underset{}{\bigcirc}\phantom{x}\right]_n-(OCH_2CH_2)_s-OH$$

or $$HO-(CH_2CH_2O)_s-\underset{}{\bigcirc\bigcirc}-(OCH_2CH_2)_s-OH$$

wherein n is 0 or 1 and s is 1 to 20,
      (b) diester of phosphonic acid or polyphosphonic acid with a dialcohol having the formula $$HO-(CHR^5-CHR^6-O)_s-\underset{\underset{O}{\|}}{\overset{R}{\underset{|}{P}}}-(O-CHR^5-CHR^6)_z-OH$$

or

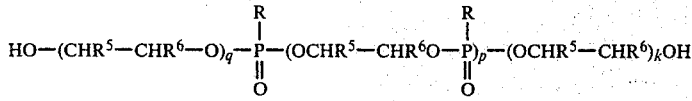

or the esters or diesters of the diols of (a) and (b) with highly volatile carboxylic acids or mixtures thereof, wherein said polyester is soluble or dispersible in water and 2.5 to 50% of polyester precursor monomer segments contain phosphonic ester moieties of the formula

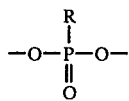

and having an apparent average molecular weight of 800 to 5000 measured in a vapor pressure osmometer with dimethylformamide solvent.

6. The polyester of claim 5, wherein one molecule of a dibasic acid of group A and one molecule of a dialcohol of group B is replaced by two molecules of (C) hydroxy acids or esters with lower monoalcohols or diols or inner esters and mixtures thereof, said hydroxy acids comprising (a) hydroxycarboxylic acids of the formula HO-R$^7$-COOH or (b) a hydroxyphosphonic acid of the formula

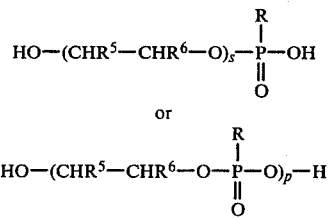

7. The process for the preparation of the polyester according to claim 1 comprising condensing 100 molar parts of dibasic acids suitable for the preparation of polyesters and 80 to 140 molar parts of dialcohols, or esters thereof, until an apparent average molecular weight of 800 to 5,000 is achieved wherein the 180 to 240 molar parts of the total starting components contain 5 to 100 molar parts of phosphonic acid ester moieties, or a mixture thereof, wherein (A) said dibasic acids are (a) aromatic, araliphatic, cycloaliphatic, aliphatic dicarboxylic acids, their acid halides, anhydrides in esters, and mixtures thereof, or (b) aliphatic, cycloaliphatic, araliphatic, aromatic phosphonic acids, their acid halides, anhydrides or esters, and mixtures thereof, or mixtures of (a) and (b), and (B) said dialcohols are (a) aliphatic, cycloaliphatic or araliphatic diols or ether moiety-containing aliphatic or cycloaliphatic diols in which the aliphatic moiety may also contain an aromatic substituent, or (b) dialcohol diesters of phosphonic acid, polyphosphonic acids or mixtures thereof, or diesters of said dialcohols with highly volatile carboxylic acids, or mixtures thereof.

8. The process according to claim 7 wherein condensation is carried out until an apparent average molecular weight of 1,500 to 3,000 is reached.

9. The process according to claim 7 wherein 90 to 130 molar parts of dialcohols or lower carboxylic acid esters thereof are employed.

10. The process according to claim 7 wherein the total starting components contain 10 to 60 molar parts of phosphonic acid moieties, phosphonic acid ester moieties, or a mixture thereof.

11. The process according to claim 7 wherein compounds of the formula

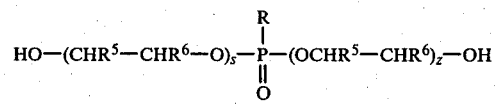

are used as the dialcohol diesters of phosphonic acids and compounds of the formula

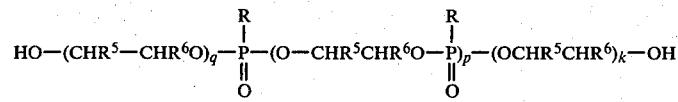

are used as the dialcohol diesters of polyphosphonic acids wherein R is hydrogen, an aliphatic moiety with 1 to 22 carbon atoms, a phenyl substituted aliphatic moiety having 1 to 12 carbon atoms in the aliphatic portion and which also may be interrupted by one or more oxygen atoms, a cycloaliphatic moiety with 5 to 8 carbon atoms, phenyl, phenyl substituted by 1 to 3 alkyls having 1 to 6 carbon atoms each, naphthyl or napthyl substituted by 1 to 3 alkyls having 1 to 6 carbon atoms each, R$^5$ and R$^6$ are H, —CH$_3$ or —C$_2$H$_5$, p is 1 to 10, s and z are each 1 to 20 and q and k are each 0, 1 or 3.

12. The process according to claim 7 wherein two parts of hydroxy acid (c) replaces one part dibasic acid and one part dialcohol, said hydroxy acids (C) being (a) hydroxycarboxylic acids, (b) hydroxyphosphonic acids of the formula

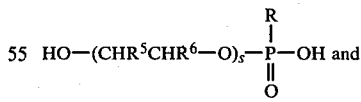 and

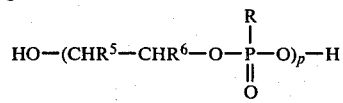

or mixtures of (a) and (b), wherein R is hydrogen, an aliphatic moiety with 1 to 22 carbon atoms, a phenyl substituted aliphatic moiety having 1 to 12 carbon atoms in the aliphatic portion and which also may be interrupted by one or more oxygen atoms, a cycloaliphatic moiety with 5 to 8 carbon atoms, phenyl, phenyl substituted by 1 to 3 alkyls having 1 to 6 carbon atoms each, naphthyl or napthyl substituted by 1 to 3 alkyls having 1 to 6 carbon atoms each, $R^5$ and $R^6$ are H, $-CH_3$ or $-C_2H_5$, s is 1 to 20 and p is 1 to 10.

13. The process according to claim 12 wherein phospholanes of the formula

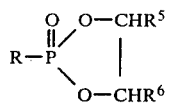

is the source of hydroxyphosphonic acids.

14. The process according to claim 7 wherein at least 50% of the molar amount of diols employed contain a moiety selected from the group consisting of $-OCH_2CH_2-(OCH_2CH_2)_r-O-$,

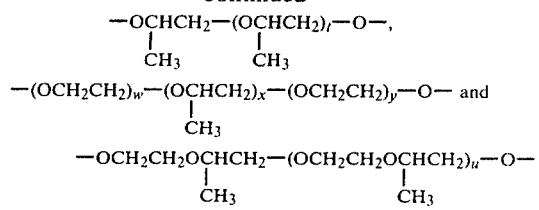

wherein r is a number from 1 to 230, t is a number from 1 to 175, u is a number from 1 to 100 and w, x and y are each equal to or greater than 1 and are of sufficient magnitude for said moiety to have a molecular weight of no more than 10,000.

15. The process according to claim 7 wherein the starting components are in the form of precondensates or oligomers.

* * * * *

UNITED STATES PATENT AND TRADEMARK OFFICE
CERTIFICATE OF CORRECTION

PATENT NO. : 4,314,052
DATED : February 2, 1982
INVENTOR(S) : Friedrich Engelhardt et al It is certified that error appears in the above-identified patent and that said Letters Patent is hereby corrected as shown below:

In Col. 23, line 29, "$-O-R^4-O,$" should read

-- $-O-R^4-O-$, the formula $-O-(CHR^5-CHR^6-O)_s -\underset{\underset{O}{\|}}{\overset{\overset{R}{|}}{P}}-(O-CHR^5-CHR^6)_z-O-$, the formula $-O-(CHR^5-CHR^6-O)_q -\underset{\underset{O}{\|}}{\overset{\overset{R}{|}}{P}}-(OCHR^5-CHR^6O-\underset{\underset{O}{\|}}{\overset{\overset{R}{|}}{P}})_p-(OCHR^5)_k O-$, the formula $-O-R^7-CO-$, the formula $-O-(CHR^5-CHR^6-O)_{\overline{s}}-\underset{\underset{O}{\|}}{\overset{\overset{R}{|}}{P}}-O-$ and the formula $-O-(CHR^5-CHR^6-O-\underset{\underset{O}{\|}}{\overset{\overset{R}{|}}{P}}-O)_{\overline{p}}$ ; --

UNITED STATES PATENT AND TRADEMARK OFFICE
CERTIFICATE OF CORRECTION

PATENT NO. : 4,314,052

DATED : February 2, 1982

INVENTOR(S) : Friedrich Engelhardt et al

It is certified that error appears in the above-identified patent and that said Letters Patent is hereby corrected as shown below:

In col. 25, line 58, "in esters, and" should read

--or esters, or--.

In col. 26, line 47, "each 0,1 or 3" should read

--each 0,1,2 or 3--;

In col. 26, line 49, "acid (c)" should read

--acid (C)--.

Signed and Sealed this

Twenty-eighth Day of June 1983

[SEAL]

Attest:

GERALD J. MOSSINGHOFF

Attesting Officer     Commissioner of Patents and Trademarks